(12) United States Patent  
Kasai

(10) Patent No.: US 8,935,012 B2  
(45) Date of Patent: Jan. 13, 2015

(54) COLLISION DETERMINATION APPARATUS FOR VEHICLE

(71) Applicant: Denso Corporation, Kariya, Aichi-pref. (JP)

(72) Inventor: Takao Kasai, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/759,386

(22) Filed: Feb. 5, 2013

(65) Prior Publication Data

US 2013/0245856 A1 Sep. 19, 2013

(30) Foreign Application Priority Data

Mar. 14, 2012 (JP) ................................. 2012-056606

(51) Int. Cl.
*G06F 17/00* (2006.01)
*B60R 21/0132* (2006.01)

(52) U.S. Cl.
CPC ............ *G06F 17/00* (2013.01); *B60R 21/0132* (2013.01)
USPC ................................................. 701/1; 701/45

(58) Field of Classification Search
USPC ........................................................ 701/1, 45
See application file for complete search history.

(56) References Cited

U.S. PATENT DOCUMENTS

| | | | |
|---|---|---|---|
| 6,347,268 B1* | 2/2002 | Fujita et al. | 701/45 |
| 2006/0065050 A1* | 3/2006 | Saito et al. | 73/511 |
| 2007/0001678 A1* | 1/2007 | Oonishi | 324/422 |
| 2007/0055429 A1 | 3/2007 | Komaki et al. | |
| 2010/0088061 A1 | 4/2010 | Horodezky et al. | |
| 2010/0241317 A1* | 9/2010 | Mihara et al. | 701/46 |
| 2012/0280334 A1* | 11/2012 | Yosida et al. | 257/415 |

FOREIGN PATENT DOCUMENTS

| | | |
|---|---|---|
| JP | 07-209327 | 8/1995 |
| JP | 2005-283290 | 10/2005 |
| JP | 2006-105598 | 4/2006 |
| JP | 2007-069711 | 3/2007 |

(Continued)

OTHER PUBLICATIONS

Office action dated Jan. 21, 2014 in corresponding Japanese Application No. 2012-056606.

(Continued)

*Primary Examiner* — Fadey Jabr
*Assistant Examiner* — Yazan A Soofi
(74) *Attorney, Agent, or Firm* — Harness, Dickey & Pierce, PLC

(57) ABSTRACT

A collision determination apparatus to be mounted in a vehicle includes a wiring substrate, a first acceleration sensor, a second acceleration sensor, an analog-to-digital converter, and a central processing unit. The wiring substrate has a first surface and a second surface opposite from each other. The first acceleration sensor is mounted on one of the first surface and the second surface. The second acceleration sensor is mounted on the other one of the first surface and the second surface in a state where the second acceleration sensor is rotated 90 degrees with respect to the first acceleration sensor. The analog-to-digital converter converts an analog signal from the first acceleration sensor or the second acceleration sensor to a digital signal. The central processing unit determines a collision by an arithmetic processing of the digital signal.

2 Claims, 1 Drawing Sheet

(56) References Cited

FOREIGN PATENT DOCUMENTS

| | | |
|---|---|---|
| JP | 2009-053141 | 3/2009 |
| JP | 2010-008696 | 1/2010 |

OTHER PUBLICATIONS

Office action dated Sep. 2, 2014 in corresponding Japanese Application No. 2012-056606.

* cited by examiner

COLLISION DETERMINATION APPARATUS FOR VEHICLE

CROSS REFERENCE TO RELATED APPLICATIONS

The present application is based on and claims priority to Japanese Patent Application No. 2012-56606 filed on Mar. 14, 2012, the contents of which are incorporated in their entirety herein by reference.

TECHNICAL FIELD

The present disclosure relates to a collision determination apparatus to be mounted in a vehicle.

BACKGROUND

Conventionally, a collision determination apparatus that determines a collision of a vehicle with an acceleration sensor and activates an occupant protection apparatus, such as an airbag, is known. JP-A-2006-105598 (corresponding to US 2006/0065050 A1) discloses an occupant protection apparatus in which two uniaxial acceleration sensors are mounted on a wiring substrate in such a manner that axes of the acceleration sensors are perpendicular to each other so as to detect accelerations in a front-rear direction (an X-axis) and a right-left direction (a Y-axis) of the vehicle.

In the above-described collision determination apparatus, a connector to be coupled with a satellite sensor or an airbag ignition device is disposed. The position of the connector depends on the vehicle in which the collision determination apparatus is mounted. For example, the connector may be disposed on a side surface of a rear portion of the wiring substrate or the connector may be disposed on a side surface of a side portion of the wiring substrate. Thus, when the collision determination apparatus is attached to various vehicles, the collision determination apparatus needs to be rotated 90 degrees depending on the vehicles.

However, if the wiring substrate is only rotated 90 degrees, detection axes of the acceleration sensors change. Thus, in order to set the detection directions to the same directions even when the wiring substrate is rotated 90 degrees, another substrate having a wiring pattern in which a mounted portion of the acceleration sensors are rotated 90 degrees needs to be prepared. Thus, a cost for preparing at least two kinds of wiring substrate may be high.

SUMMARY

It is an object of the present disclosure to provide a collision determination apparatus in which a collision detection direction can be changed 90 degrees without changing a wiring pattern of a wiring substrate.

A collision determination apparatus according to an aspect of the present disclosure includes a wiring substrate, a first acceleration sensor, a second acceleration sensor, an analog-to-digital converter and a central processing unit. The wiring substrate has a first surface and a second surface opposite from each other. The first acceleration sensor is mounted on one of the first surface and the second surface of the wiring substrate. The second acceleration sensor is mounted on the other one of the first surface and the second surface of the wiring substrate in a state where the second acceleration sensor is rotated 90 degrees with respect to the first acceleration sensor. The analog-to-digital converter converts an analog signal transmitted from the first acceleration sensor or the second acceleration sensor to a digital signal. The central processing unit determines a collision by an arithmetic processing of the digital signal.

In the collision determination apparatus, a collision detection direction can be changed 90 degrees in spite of using the same wiring substrate.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Figure 1:
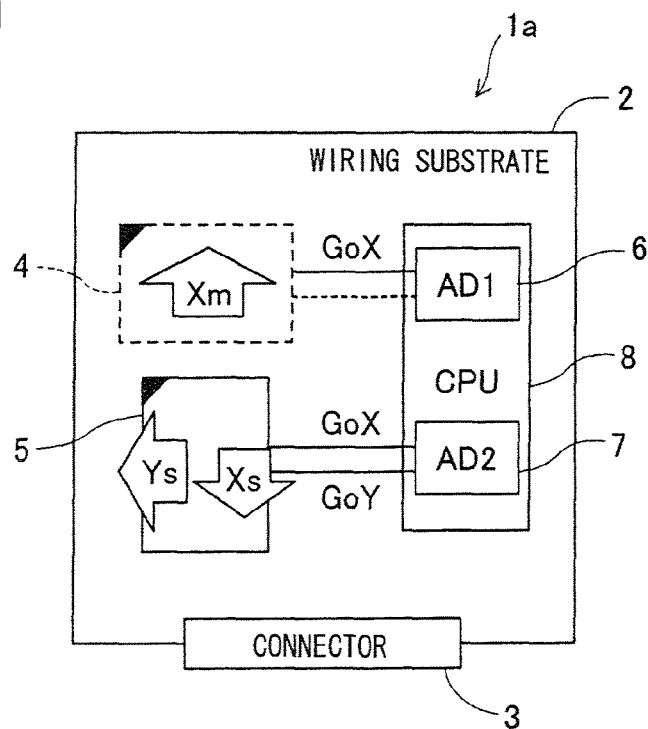
FIG. 1 is a diagram showing a collision determination apparatus according to a first embodiment of the present disclosure.

A collision determination apparatus 1a according to a first embodiment of the present disclosure will be described with reference to FIG. 1. The collision determination apparatus 1a is a part of an electronic control unit (ECU) for an occupant protection apparatus which is not shown. The collision determination apparatus 1a includes a connector 3, a first acceleration sensor 4, a second acceleration sensor 5, an analog-to-digital (AD) converter (AD1) 6, an AD converter (AD2) 7, and a central processing unit (CPU) 8 mounted on a wiring substrate 2.

The connector 3 is configured to be coupled with a wire harness so as to enable signal transfer between the ECU for the occupant protection apparatus and an external device such as a satellite sensor and a squib of an airbag disposed at various positions of the vehicle. The first acceleration sensor 4 is a uniaxial main sensor and detects acceleration Xm in a front-rear direction of the vehicle. The second acceleration sensor 5 is biaxial safing sensor and detects acceleration Xs in the front-rear direction of the vehicle and acceleration Ys in a right-left direction of the vehicle. The second acceleration sensor 5 is in a range of level to perform a safing determination (e.g., about 20 G) and has the same characteristic in Xs detection and Ys detection. The first acceleration sensor 4 transmits an analog signal indicating a voltage GoX in accordance with a magnitude of the acceleration Xm generated in a direction shown by the arrow in FIG. 1. The second acceleration sensor 5 transmits analog signals indicating a voltage GoX and a voltage GoY in accordance with magnitudes of the accelerations Xs, Ys generated in directions shown by arrows in FIG. 1. The AD converter 6 converts the analog signal transmitted from the first acceleration sensor 4 into a digital signal and transmits the digital signal to the CPU 8. The AD converter 7 converts the analog signals transmitted from the second acceleration sensor 5 into digital signals and transmits the digital signals to the CPU 8.

The CPU 8 determines that a front collision occurs when the digital signal corresponding to the acceleration Xm in the front-rear direction of the vehicle, which is detected by the first acceleration sensor 4, is greater than a threshold value stored in a storage portion in the CPU 8 and then transmits a signal to the occupant protection apparatus. In order to secure a redundancy of a collision determination by the CPU 8, the CPU 8 takes into account the digital signal corresponding to the acceleration Xs in the front-rear direction of the vehicle, which is detected by the second acceleration sensor 5. The acceleration Xm in the front-rear direction of the vehicle detected by the first acceleration sensor 4 and the acceleration Xs in the front-rear direction of the vehicle detected by the second acceleration sensor 5 have output voltages having reverse polarities. Thus, a malfunction due to noises can be restricted.

Furthermore, the CPU 8 determines that a side collision occurs when the digital signal corresponding to the acceleration Ys in the right-left direction of the vehicle, which is detected by the second acceleration sensor 5, is greater than a threshold value stored in the storage portion in the CPU 8 and then transmits a signal to the occupant protection apparatus.

The wiring substrate 2 is mounted with the connector 3, the first acceleration sensor 4, the second acceleration sensor 5, the AD converters 6, 7, and the CPU 8. The wiring substrate 2 has a first surface and a second surface opposite from each other. The first acceleration sensor 4 is mounted on the second surface of the wiring substrate 2. The second acceleration sensor 5 is mounted on the first surface of the wiring substrate 2. The first acceleration sensor 4 and the second acceleration sensor 5 are mounted perpendicularly to each other so that the acceleration Xs of the first acceleration sensor 4 and the acceleration Ys of the second acceleration sensor 5 are perpendicular to each other. In other words, the first acceleration sensor 4 and the second acceleration sensor 5 are mounted in such a manner that the second acceleration sensor 5 is rotated 90 degrees and is reversed with respect to the first acceleration sensor 4. Lands of the first acceleration sensor 4 and the second acceleration sensor 5 have the same arrangement and the same dimension and are interchangeable. Thus, when changed between the first surface and the second surface of the wiring substrate 2, a power source and a signal pin can be mounted on the same lands of the wiring substrate 2. However, in cases where a part of signal pins is different, a switching resistor may be disposed for switching. The switching resistor enables both the first acceleration sensor and the second acceleration sensor to be mounted on the same land.

Figure 2:
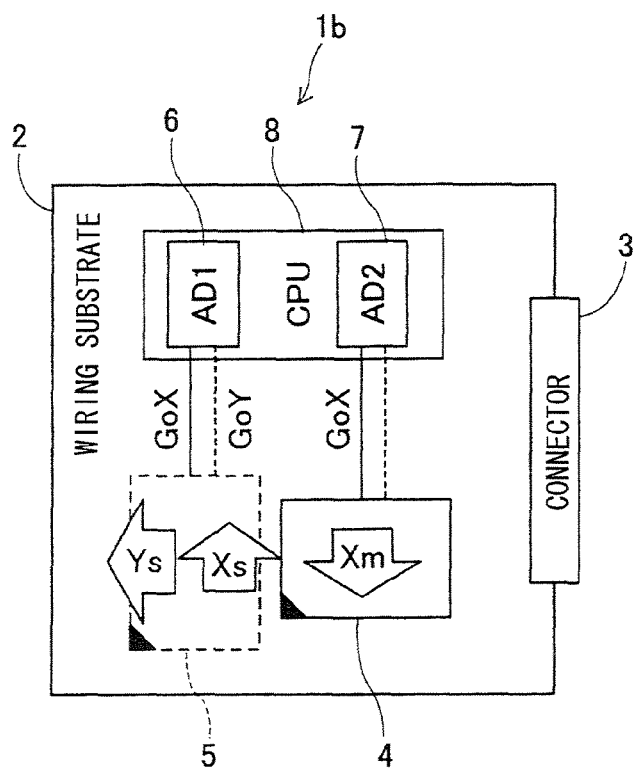
FIG. 2 is a diagram showing a collision determination apparatus according to a second embodiment of the present disclosure.

A collision determination apparatus 1b according to a second embodiment of the present disclosure will be described with reference to FIG. 2. In the collision determination apparatus 1b, even when acceleration detection directions are same as the acceleration detection directions of the collision determination apparatus 1a, a position of the connector 3 can be changed to a position rotated 90 degrees in a counterclockwise direction.

The second acceleration sensor 5 in the collision determination apparatus 1b is disposed at a position on the second surface of the wiring substrate 2 corresponding to a position of the first acceleration sensor 4 in the collision determination apparatus 1a. The first acceleration sensor 4 in the collision determination apparatus 1a is disposed at a position on the first surface of the wiring substrate 2 corresponding to a position of the second acceleration sensor 5 in the collision determination apparatus 1a.

Each of the collision determination apparatuses 1a, 1b according to the above-described embodiments includes the wiring substrate 2, the first acceleration sensor 4, the second acceleration sensor 5, the AD converters 6, 7, and the CPU 8. The first acceleration sensor 4 is mounted on one of the first surface and the second surface of the wiring substrate 2, and the second acceleration sensor 5 is mounted on the other one of the first surface and the second surface of the wiring substrate 2 in a state where the second acceleration sensor 5 is rotated 90 degrees with respect to the first acceleration sensor 4. Each of the AD converters 6, 7 converts the analog signal transmitted from the first acceleration sensor 4 or the second acceleration sensor 5 to the digital signal. The CPU 8 determines a collision by an arithmetic processing of the digital signal. Thus, by using the same wiring substrate 2, the collision detection directions can be rotated 90 degrees without increasing the number of mounted elements. In addition, even when the safing sensor is used, a reverse characteristic from the main sensor can be secured. Thus, a malfunction due to noises can be restricted.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

For example, the second acceleration sensor 5 according to the above-described embodiments is described as the biaxial safing sensor. However, the second acceleration sensor 5 may also be a uniaxial.

In the first embodiment, the first acceleration sensor 4 is mounted on the second surface of the wiring substrate 2 and the second acceleration sensor 5 is mounted on the first surface of the wiring substrate 2. However, the first acceleration sensor 4 may also be mounted on the first surface of the wiring substrate 2 and the second acceleration sensor 5 may also be mounted on the second surface of the wiring substrate 2.

What is claimed is:

1. A collision determination apparatus to be mounted in a vehicle comprising:
   a wiring substrate having a first surface and a second surface opposite from each other;
   a first acceleration sensor mounted on one of the first surface and the second surface of the wiring substrate;
   a second acceleration sensor mounted on the other one of the first surface and the second surface of the wiring substrate in a state where the second acceleration sensor is rotated 90 degrees with respect to the first acceleration sensor;
   an analog-to-digital converter converting an analog signal transmitted from the first acceleration sensor or the second acceleration sensor to a digital signal; and
   a central processing unit determining a collision by an arithmetic processing of the digital signal; wherein
   one of the first acceleration sensor and the second acceleration sensor is a uniaxial main sensor and the other one of the first acceleration sensor and the second acceleration sensor is a biaxial safing sensor;
   the uniaxial main sensor detects an acceleration in a front-rear direction of the vehicle that is parallel to the first surface and the second surface of the wiring substrate;
   the biaxial safing sensor detects accelerations in the front-rear direction and a right-left direction of the vehicle that is parallel to the first surface and the second surface of the wiring substrate;
   the biaxial safing sensor is housed in one package in the collision determination apparatus.

2. The collision determination apparatus according to claim 1, further comprising
   a switching resistor enabling both the first acceleration sensor and the second acceleration sensor to be mounted on the same land.

* * * * *